United States Patent
Johnson

(10) Patent No.: US 7,664,534 B1
(45) Date of Patent: Feb. 16, 2010

(54) COMMUNICATIONS SYSTEM AND METHOD USING REMOTE ANTENNAS

(75) Inventor: Harold W. Johnson, Roach, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 559 days.

(21) Appl. No.: 10/859,680

(22) Filed: Jun. 3, 2004

(51) Int. Cl.
*H04M 1/00* (2006.01)

(52) U.S. Cl. .................. 455/562.1; 455/561; 455/7; 455/13.1; 455/524

(58) Field of Classification Search ............. 455/562.1, 455/561, 7, 13.1, 524
See application file for complete search history.

(56) References Cited

U.S. PATENT DOCUMENTS

| | | | | |
|---|---|---|---|---|
| 5,805,996 | A * | 9/1998 | Salmela ................... | 455/453 |
| 6,188,912 | B1 * | 2/2001 | Struhsaker et al. ........ | 455/561 |
| 6,353,600 | B1 * | 3/2002 | Schwartz et al. .......... | 370/328 |
| 6,714,800 | B2 * | 3/2004 | Johnson et al. ........... | 455/561 |
| 6,785,558 | B1 * | 8/2004 | Stratford et al. .......... | 455/561 |
| 6,898,419 | B1 * | 5/2005 | Fayeski et al. ............ | 455/125 |
| 7,088,288 | B1 * | 8/2006 | Margolese et al. ........ | 342/377 |
| 7,187,949 | B2 * | 3/2007 | Chang et al. ............. | 455/562.1 |
| 2002/0055371 | A1 * | 5/2002 | Arnon et al. ............. | 455/562 |

OTHER PUBLICATIONS

"MIKOM U.S. Announces Immediate Availability of Multiple Solutions for the Most Flexible wireless Signal distribution System: The Base Station Hotel," Andrew (Aug. 19, 2003). www.mikomus.com/newsrm/030113.html).
"Minimizing Backhaul Circuit Charges in Wireless Networks," Integrating Multiple Cell Site Traffic onto a Single T1 Link with CrossPATH™ II ISCU (Jun. 1999).
"Ogier Electronics," (Aug. 19, 2003) (www.ogierelectronics.com/broad-2htm).
"Rural Daisy Chained Base Stations," (Aug. 19, 2003). (www.ogierelectronics.com/broad-pic2.htm).
Lee, "Reliable Daisy-Chain Designs," Wireless Review (Jan. 1, 2000). (www.wirelessreview.com/ar/wireless_reliable_daisychain_designs/).
Wong, "Eliminate the Backhaul Link," AirNet Feature Story (Oct. 1, 1999). (www.aircom.com/pn_feature.htm).
"AirSite Backhaul Free Base Station," AirNet. (www.aircom.com/pr_airsite.htm).
"AdaptaCell Broadband, Software-Defined Base Station," AirNet (www.aircom.com/pr_adaptacell.htm).
"Cellular Backhaul Using Wireless Mesh Topologies" InterWave (2002).
"CrossPATH," Kentrox (www.kentrox.com/products/crosspath_2/index.asp).
Wong, "Filling the Generation Gap with Software-Defined, Broadband Radio," CTI (vol. 4, No. 9).

* cited by examiner

*Primary Examiner*—Lana N Le
*Assistant Examiner*—Ping Hsieh

(57) ABSTRACT

In a communications system, one or more remote antenna systems communicate with one another and with associated base stations using a millimeter band microwave link, such as an E-band communications link. The remote antennas may be daisy-chained together to communicate with a plurality of base stations located at a base station hotel. Remote antennas may be positioned in cells having different peak traffic times to enable load balancing between base stations that share a common backhaul communications link with a mobile switching center.

11 Claims, 6 Drawing Sheets

COMMUNICATIONS SYSTEM AND METHOD USING REMOTE ANTENNAS

BACKGROUND

Cellular networks provide a communications path between each subscriber's mobile phone and a mobile switching center (MSW). The mobile switching center manages communications to and from mobile phones in a variety of locations. These communications travel between the mobile switching center and subscribers' mobile phones through a base station. Typically, several base stations are affiliated with each mobile switching center, and each mobile phone communicates through a base station that is nearby relative to other base stations. As the mobile phone changes location (when, for example, its user is driving in a car), it may also change the base station through which it communicates.

The area in which a mobile phone can communicate with particular base station is known as a cell. Each base station has a radio frequency (RF) antenna, through which it communicates with the mobile telephones within the cell. Each base station also has a backhaul facility, through which it communicates with the mobile switching center to carry mobile telephone conversations within the cell. The backhaul facility typically communicates with the mobile switching center through either a microwave link or a terrestrial wire, such as a T-1 line.

To provide a high quality of mobile phone service, it is desirable for these cells to be adjacent to one another, leaving no intermediate gaps in which cellular phone service is unavailable. Likewise, each cell should be arranged such that its corresponding base station has the capacity to handle all the telephone conversations carried out by users at peak times within the cell. Thus, a central business district in which many mobile telephones are used during the business day is typically provided with a higher density of base stations, each with a smaller cell, than in outlying areas.

Designing a cellular network for a high quality of service involves a number of complicating issues. For example, to avoid gaps in service areas, so-called "coverage holes," it may appear desirable to design larger cells that are served by base stations with high-power antennas. However, the larger cell would encompass more subscribers and may cause calls to be dropped if the capacity of the base station is exceeded. Another solution—increasing the number (and, accordingly, the density) of base stations—entails a great financial expense, the regulatory and architectural challenge of finding (and leasing) a desirable location for each base station, and the task of arranging for backhaul communications from each new base station to the mobile switching center.

To provide flexibility in the design of mobile telephone networks, remote antenna systems have now become available. A remote antenna system corresponds to a particular base station, but it can be positioned remotely from its corresponding base station. Several remote antennas can be associated with each base station, allowing the cell associated with the base station to extend into carefully controlled areas. For example, if the mobile telephone service provider determines that there is a coverage hole between two existing cells, it can position a remote antenna within that hole and associate that remote antenna with an existing base station.

One available remote antenna system is the Digivance Long-Range Coverage Solution (LRCS), from ADC Telecommunications, Inc., of Minneapolis, Minn. Although remote antenna systems provide additional flexibility to mobile telephone service providers, the service provider must still arrange for communications between the base station and the remote antenna system. These communications typically take place over a fiber optic line. As a result, the service provider must arrange for a terrestrial path between the remote antenna system and the base station. If the remote antenna system is located within the same building (such as a sports arena, for example) as the base station, it may be feasible to run a fiber optic line. This fiber optic tether, however, restricts a more flexible arrangement of base stations and remote antenna system, particularly as the desired separation between the two becomes greater.

SUMMARY

A communications system as described herein makes use of one or more remote antenna systems. A remote antenna system communicates with a base station over a millimeter band microwave link, such as an E-band communications link.

Each remote antenna system communicates with a base station and

A plurality of base stations may be situated in a single location. A remote antenna system is associated with each of the base stations. In one embodiment, each base station sends communications to its corresponding remote antenna system, which in turn transmits those signals as radio frequency signals to users' mobile telephones. In this embodiment, each remote antenna system operates to receive communications destined for other remote antenna systems and to relay those communications to those other remote antenna systems.

In one embodiment, a plurality of remote antenna systems are situated in a "daisy chain" arrangement, wherein one remote antenna system communicates directly with the base stations, and that remote antenna system relays communications to other remote antenna systems further down the chain.

DETAILED DESCRIPTION

I. Overview of an Exemplary Embodiment

Figure 1:
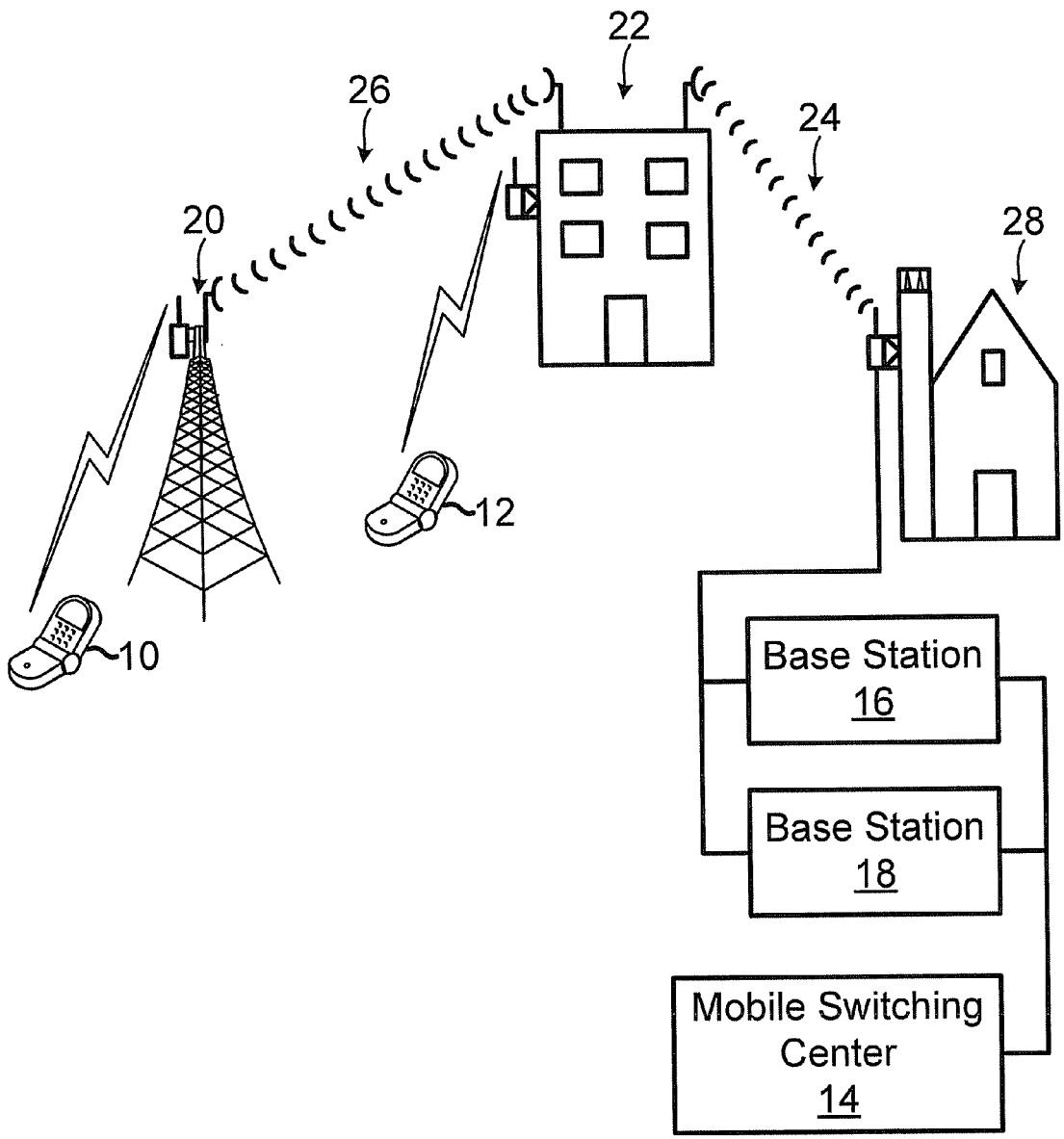
FIG. 1 is a schematic illustration of a communications system employing remote antenna systems.

A communications system employing E-band remote antennas is illustrated in FIG. 1. In that drawing, mobile telephones 10 and 12 are each conducting telephone communications through a mobile switching center 14. The first mobile telephone 10 communicates with the mobile switching center 14 through a first base station 16, while the second mobile telephone 12 communicates with the mobile switching center 14 through a second base station 18. (It is possible, but not necessary, that the two mobile phones 10 and 12 are on a call with one another.)

Each of the base stations corresponds to a different remote antenna system. The first base station 16 corresponds to the first remote antenna system 20, while the second base station 18 corresponds to the second remote antenna system 22.

Thus, RF communications with the first remote antenna system 20 pass through the first base station 16, while RF communications with the second remote antenna system 22 pass through the second base station 18.

The remote antenna systems communicate with the base stations over E-band communications paths. As illustrated in FIG. 1, these remote antenna systems are arranged in a "daisy chain," with only the most proximal of the remote antenna systems (in this case, the second remote antenna system 22) being in direct communication with the base stations. The most distal of the remote antenna systems (in this case, the first remote antenna system 20) communicates indirectly with the base stations through the other remote antenna.

Because the E-band communication paths are shared, each remote antenna system is provided with repeater logic to determine which communications are destined for it and which communications should be passed further down the chain. Each remote antenna system also includes an RF transceiver to communicate with corresponding mobile telephones.

In accordance with the arrangement of FIG. 1, outbound communications from the mobile switching center 14 to the first mobile telephone 10 travel from the mobile switching center to the first base station 16, over a T1 terrestrial data line, for example. From the first base station, these outbound signals are transmitted over an E-band transmission path 24 to the second remote antenna system 22. The second remote antenna system 22 determines that the signals are for a remote antenna further down the chain, and it retransmits the signals over another E-band transmission path 26 to the first remote antenna system 20. The first remote antenna system 20 determines that the signals are destined for it, and it retransmits the signals as an RF transmission to the first mobile telephone 10.

Similarly, outbound communications from the mobile switching center 14 to the second mobile telephone 10 travel from the mobile switching center 14 to the second base station 18. From the second base station, the signals are transmitted over the E-band transmission path 24 to the second remote antenna system 22. The second remote antenna system determines that the signals are destined for it, and it retransmits these signals as an RF transmission to the second mobile telephone 12.

Inbound communications from the mobile telephones 10 and 12 to the mobile switching center 14 travel along the respective paths described above, but in the opposite sense. As used herein, the term "outbound" refers to communications traveling in the direction from the mobile switching center to users' mobile telephones, while "inbound" refers to communications in the direction from users' mobile telephones toward the mobile switching center.

As may be seen from FIG. 1, multiple base stations 16 and 18 may be provided in the same location 28, while the antennas 20 and 22 respectively associated with those base stations are in different locations (from each other and from the base stations). Moreover, no terrestrial connection, such as fiber optic or T1 line, is necessary from the base stations to the mobile antennas, or between the mobile antennas.

II. Frequency Selection

In the preferred embodiment, the remote antenna systems communicate with the base stations and among themselves through the use of E-band wireless communications. The E-band encompasses frequencies in the ranges of 71-76 GHz, 81-86 GHz, and 92-95 GHz. Allocation of the E-band by the Federal Communications Commission is described in, for example, "Allocations and Service Rules for the 71-76 GHz, 81-86 GHz and 92-95 GHz Bands," FCC 03-248 (Nov. 4, 2003).

E-band transmissions pass exceptionally well through a variety of atmospheric conditions, allowing a transmission range of over 1 kilometer. E-band transmissions have a range of approximately 1.5-2.0 miles (2.4-3.2 kilometers) at 99.999% reliability, or three miles at 99.99% reliability. Band width of an E-band link is approximately 1.5 Gbps.

The remote antenna systems described herein may alternatively be implemented with different microwave frequencies, including the V-band or other millimeter-band communications. The V-band is situated at approximately 60 GHz. Unlike E-band, which requires path licensing from the Federal Communications Commission (FCC), the V-band allows license-free links. However, the V-band is less impervious to weather, allowing for a range of only around 300-500 meters at 99.999% reliability, or 700-950 meters at 99.9% reliability. Enhanced power V-band communications, where permitted by the FCC, can slightly increase the range, with a range of 400-700 meters at 99.999% reliability, or 700-950 meters at 99.9% reliability.

III. Remote Antenna System

Figure 2:
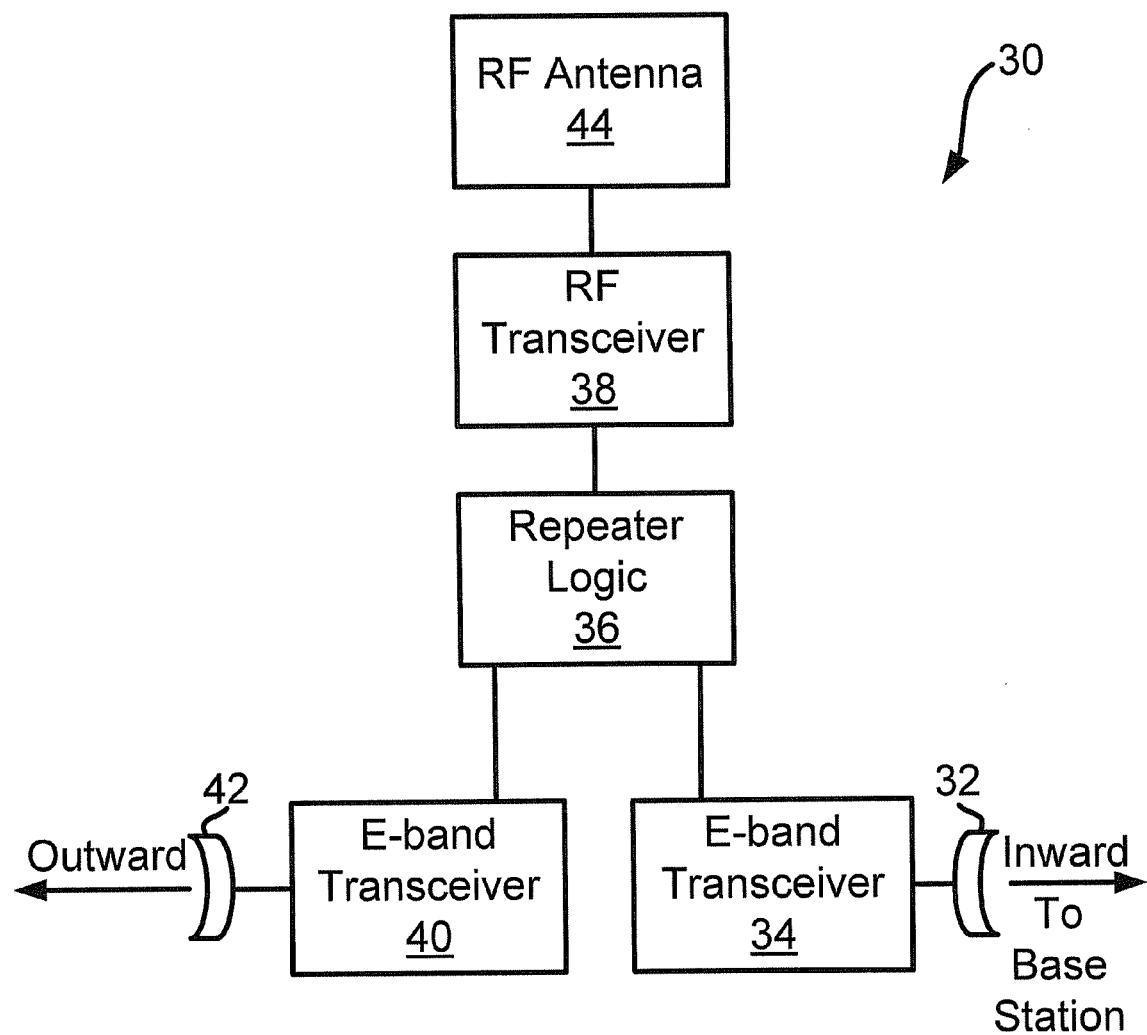
FIG. 2 is a functional block diagram of a remote antenna system.

One embodiment of a remote antenna system is illustrated in FIG. 2. A remote antenna system 30 is positioned at a location remote from its corresponding base station. The remote antenna system 32 includes an inward E-band transceiver 34 with a corresponding microwave antenna 32 and an outward E-band transceiver 40 with a corresponding outward microwave antenna. The remote antenna system 30 is further provided with an RF transceiver and a corresponding RF antenna 44.

The E-band transceivers 34, 40 and associated antennas allow the remote antenna system to communicate with other remote antenna systems and/or with one or more base stations. The RF transceiver 38 and its associated RF antenna allow the remote antenna system to communicate with users' mobile telephones. The RF transceiver may communicate with users' mobile telephones through the use of, for example, code division multiple access (CDMA) communications.

The R-band transceivers and the RF transceiver are all coupled to repeater logic 36. The repeater logic 36 directs all incoming and outgoing signals within the remote antenna system. In one embodiment, the repeater logic 36 handles four basic types of communications received at the remote antenna system 30: (1) inbound RF communications (2) inbound E-band communications, (3) outbound E-band communications intended for the remote antenna system 30, (4) outbound E-band communications intended for other remote antenna systems, and. Each of these is described in turn.

Inbound RF communications are communications that have arrived at the remote antenna system 30 from user's mobile telephones. These signals may include, for example, those user's voice signals encoded as CDMA data. The remote antenna system 30 receives these signals at the RF antenna 44 and demodulates the signals at the RF transceiver 38. The repeater logic 36 operates to direct these signals inward, toward the base station that corresponds to the remote antenna system 30. To do so, it combines these signals with any other inbound E-band communications and forwards the combined signals to the inward E-band transceiver 34 for transmission along the inward direction.

Inbound E-band communications are communications that have arrived at the remote antenna system 30 from other remote antenna systems further down the chain. The remote antenna system 30 receives these inbound E-band communications at microwave antenna 42 and E-band transceiver 40. As described above, the repeater combines these inbound E-band communications with any inbound RF communications and forwards the combined signals to the inward E-band transceiver 34 for transmission along the inward direction.

Outbound E-band Communications are communications from a base station directed to a remote antenna system. These communications include, for example, digitized voice signals of parties who are speaking with the mobile telephone users. The remote antenna system 30 receives these outbound E-band communications at E-band transceiver 34, which demodulates these communications and forwards them to the repeater logic 36. If these communications are intended for the particular remote antenna system at which they have arrived (that is, they were sent by the base station corresponding to that remote antenna), then the repeater logic 36 forwards those signals to the RF transceiver 38, which re-modulates these signals into RF transmissions and sends them over the RF antenna 44 to users' mobile telephones.

The remote antenna system 30 may also receive outbound E-band communications directed to different remote antenna systems, particularly to remote antenna systems that are further outward from the base stations. After those communications are demodulated by the E-band transceiver 34, they are forwarded by the repeater logic 36 to the outward E-band transceiver 40, which re-modulates the signals and forwards them to remote antenna systems further outward from the base stations.

The exemplary remote antenna system illustrated in FIG. 2 is shown with a single inward microwave antenna and a single outbound microwave antenna. In other embodiments, the remote antenna system may include more than one antenna in one or both of the directions. For example, a remote antenna system with more than one outward antenna allows an architecture in which the chain of remote antenna systems branches outward. For each additional microwave antenna, another E-band transceiver may be provided. Likewise, with additional branches, the repeater logic 36 may operate to direct communications along the correct branch.

IV. Base Station Hotel

Figure 3:
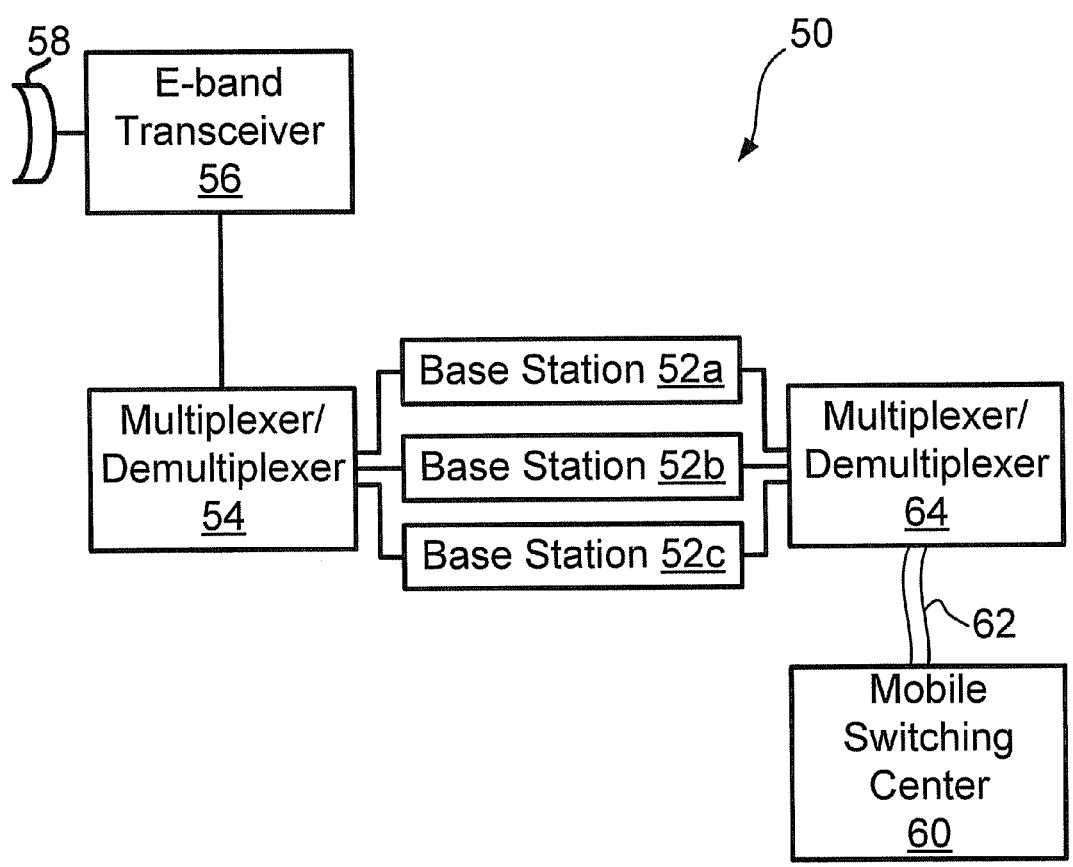
FIG. 3 is a functional block diagram of a base station hotel.

A communication system that makes use of E-band remote antenna systems may make use of a base station hotel to combine more than one base station in a single location. An exemplary base station hotel 50 is illustrated in FIG. 3. The exemplary base station hotel 50 includes three base stations 52*a*, 52*b*, 52*c*. Outbound communications from the base stations 52*a-c* are multiplexed by a multiplexer/demultiplexer 54 and forwarded to an E-band transceiver 56 for transmission to a mobile antenna system.

Inbound communications from a mobile antenna system are received at a microwave antenna 58 and demodulated at the E-band transceiver 56. These communications are then forwarded to the multiplexer/demultiplexer 54, where they are demultiplexed and directed to the proper base station.

The base stations 52*a-c* may likewise communicate with a mobile switching center 60 over a single communications line, such as T1 line 62, with the use of a second multiplexer/demultiplexer 64. T1 line 62 carries the "backhaul" from the base stations 52*a-c* to the mobile switching center. Alternatively each of the base stations may have its own communications line with the mobile switching center, or other arrangements may be made to carry the backhaul to the mobile switching center.

V. Network Architecture

Figure 4:
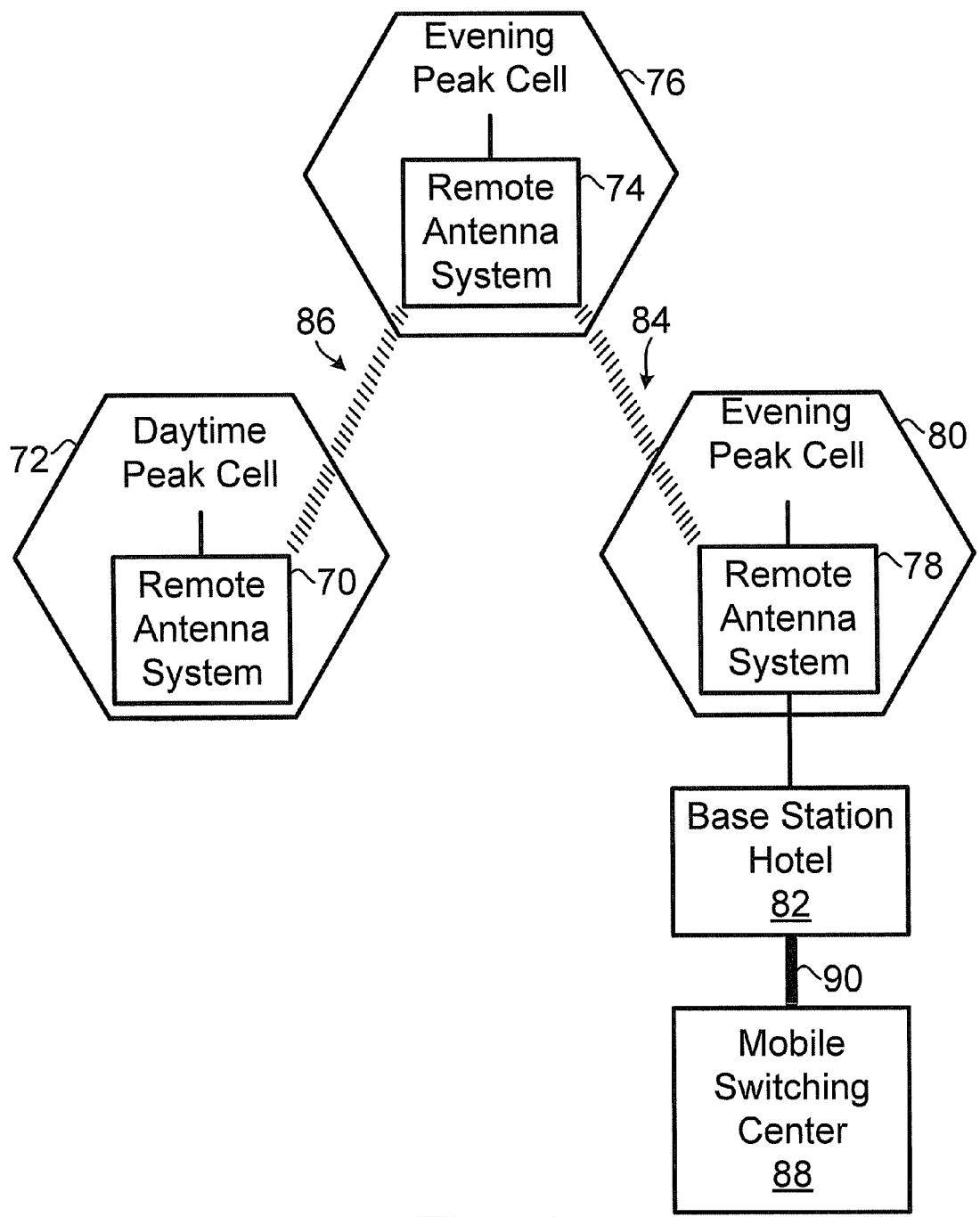
FIG. 4 is a schematic illustration of a communications system employing remote antenna systems.

One use of remote antenna systems allows load balancing between cells whose usage peaks at different times. One such implementation is illustrated schematically in FIG. 4. In FIG. 4, one remote antenna system 70 is placed in a cell 72 for which the peak time (i.e., the time of day during which mobile telephone usage within the cell is at its highest) falls during the day, such as might be the case for a cell located in a central business district. Another remote antenna system 74 is positioned in a cell 76 in which the peak times fall during the evening, as in a residential area. A third remote antenna system 78 is positioned in a cell 80 in which the peak times also fall during the evening.

The third remote antenna system 78 communicates with a base station hotel 82. The other remote antenna systems 74 and 70 are chained together over E-band transmission paths 84 and 86. The base station hotel 82 multiplexes communications from all the remote antenna systems 70, 74, 78 into a single communications link 90 with a mobile switching center 88. The communications link 90 may be, for example, a T1 line. The peak times of the cells fall at different times, so that when traffic from the daytime peak cell 72 is at its highest, traffic from the evening peak cells 76, 80 is at a lull. Likewise the reverse is true, so that in the evening, traffic from the daytime peak cell 72 is at a lull. This makes it less likely that the T1 line 90 will be overloaded at one particular time of day, while at the same time increasing the average amount of data that it transmits over the course of the day.

In the embodiment shown, two evening peak cells 76, 80 supply the same base station hotel 82 with the expectation that usage at the evening peak will be less dramatic than usage at the daytime peak.

With the use of E-band transmissions, each transmission path may exceed 1000 meters in distance, providing designers with greater flexibility to position remote antenna systems in locations that will provide improved service.

Because the remote antenna systems are not required to include base station equipment, they are generally smaller and more versatile than prior art base stations. As a result, these remote antenna systems may be positioned in areas not ordinarily available for base stations, such as on utility poles or on buildings where larger base station equipment would not be permitted.

VI. Communications Method

Figure 5:
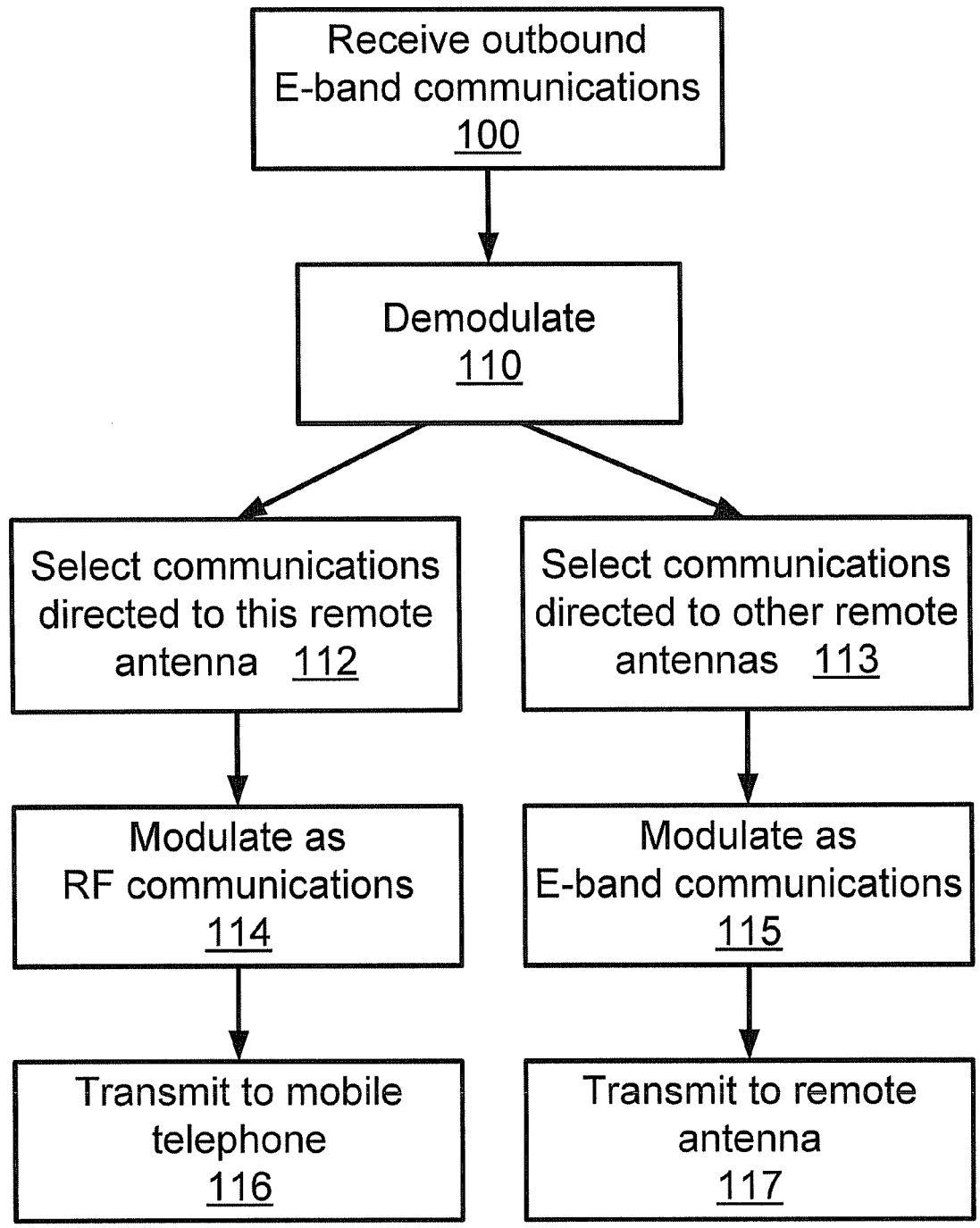
FIG. 5 is a flow chart illustrating a method performed at a remote antenna system.

A method of operating a remote antenna system to handle outbound communications is illustrated in FIG. 5. The remote antenna receives outbound E-band communications at step 100. (Again, this means outbound with respect to a mobile switching center, not with respect to the remote antenna system.) At step 110, the system demodulates the E-band communications. At step 112, the system selects communications that are directed to this remote antenna. This selection may be based on, for example, addressing information included with a frame of data in the outbound data communications. The system then re-modulates the selected communications into RF communications at step 114, and it transmits the RF communications to a mobile telephone at step 116.

In step 113, the system selects communications that are directed to other remote antennas. At step 115, the system modulates the selected communications into E-band communications, and at step 117, the system transmits the E-band communications to another remote antenna system.

Figure 6:
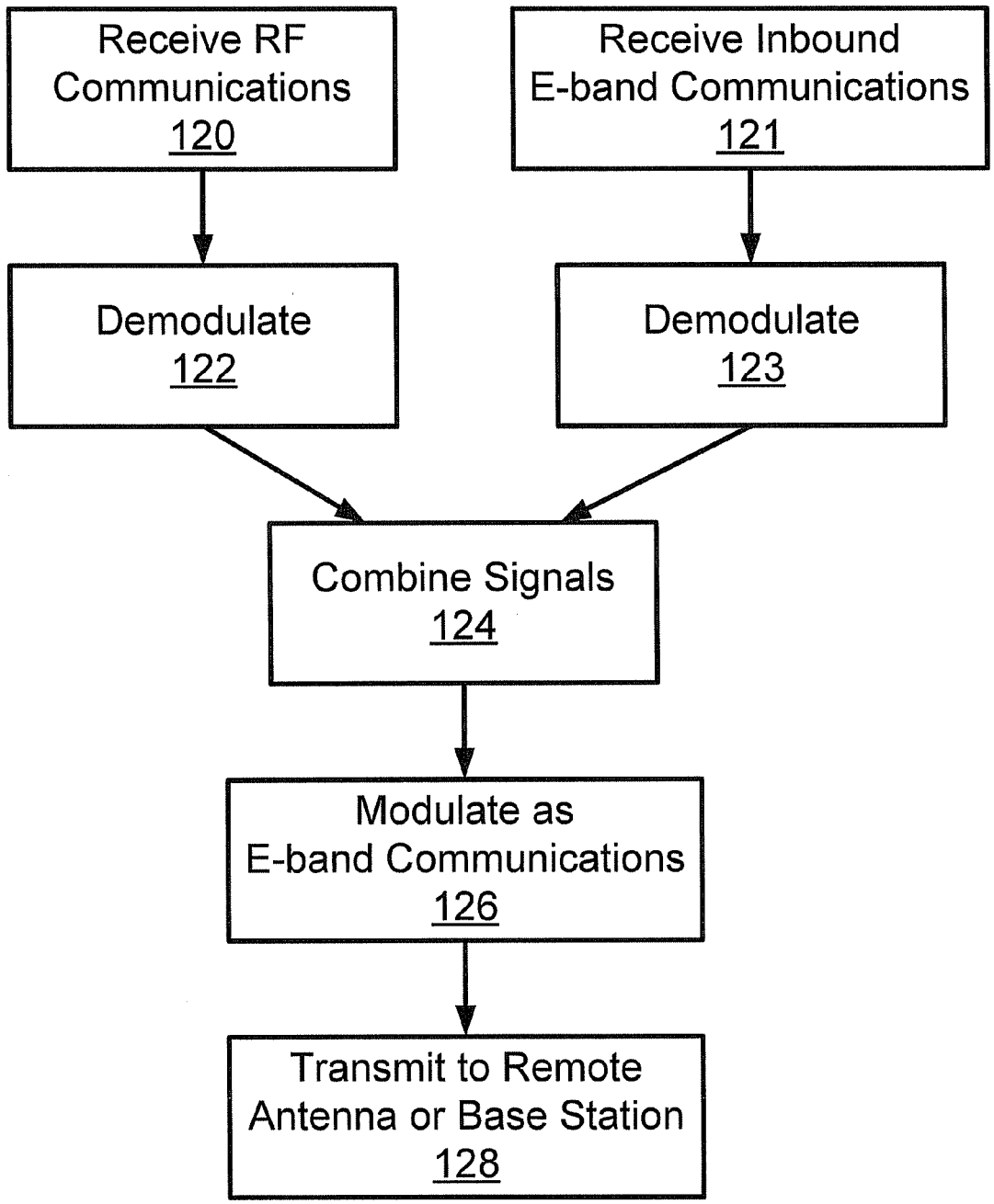
FIG. 6 is a flow chart illustrating a method performed at a remote antenna system.

A method of operating a remote antenna system to handle inbound communications is illustrated in FIG. 6. The remote antenna receives RF communications from a mobile telephone in step 120. It demodulates these communications in step 122. In step 121, the system receives inbound E-band communications. It demodulates these communications in step 123. The system combines the demodulated RF and E-band signals in step 124, for example by inserting digital data packets from both communications into a single stream. In step 126, the system re-modulates the combined communications into an E-band communication, and in step 128, the system transmits the combined E-band communications inward to a remote antenna or (if the system is the most inward of the remote antenna systems) to a base station.

VII. Alternative Embodiments

Although implementations of the invention have been described by way of example with wireless E-band connections between the base stations and remote antennas, it is contemplated that one or more of those connections may be made by T1, fiber optic, or other terrestrial connection. Such a substitution may be economical where, for example, terrain or licensing issues make use of an E-band connection impractical or impossible.

The terms "inward" and "outward" have been used herein by way of example to more clearly illustrate particular implementations of a remote antenna system. The use of these terms is not intended to exclude alternative embodiments from the claimed scope of the invention. Such alternative embodiments may include those in which remote antennas are chained together into a loop, or embodiments in which base stations are situated at more than one location along a chain of remote antenna systems.

Although the invention has been described with reference to mobile telephone systems, other embodiments within the scope of the invention may be devised that include other forms of communications as an alternative or in addition to mobile telephone communications.

The scope of the claimed invention is not limited by the particular examples given above, but rather is defined by the following claims.

The invention claimed is:

1. A communications system comprising:
   a first base station;
   a second base station in the same location as the first base station;
   a first remote antenna system that corresponds only to the first base station; and
   a second remote antenna system that corresponds only to the second base station;
   wherein the first base station and the first remote antenna system are in communication with one another over a first E-band communications path,
   wherein the first E-band communications path comprises an E-band communications path between the first remote antenna system and the same location as the first base station,
   wherein the second base station and the second remote antenna system are in communication with one another over the first E-band communications path and a second E-band communications path,
   wherein the second E-band communications path comprises an E-band communications path between the first remote antenna system and the second remote antenna system,
   wherein communications transmitted to the first remote antenna system over the first E-band communications path include communications from the first base station and communications from the second base station, and
   wherein communications transmitted to the second remote antenna system via the second E-band communications path include the communications from the second base station but do not include the communications from the first base station.

2. The communications system of claim 1, wherein each remote antenna system includes at least one E-band transceiver.

3. The communications system of claim 1, wherein the first E-band communications path is greater than 1 km in distance.

4. A communications system comprising:
   a first base station;
   a second base station, wherein the first base station and the second base station share a common communications link with a mobile switching center;
   a first remote antenna system that corresponds only to the first base station;
   a second remote antenna system that corresponds only to the second base station; and
   a transceiver that connects to the first base station and to the second base station,
   wherein the first base station and the first remote antenna system are in communication with one another over a first microwave communications link,
   wherein the first microwave communications link comprises a microwave communications link between the first remote antenna system and the transceiver,
   wherein the second base station and the second remote antenna system are in communication with one another over a second microwave communications link,
   wherein the second microwave communications link comprises a microwave communications link between the first remote antenna system and the second remote antenna system,
   wherein communications transmitted to the first remote antenna system over the first microwave communications link include communications from the first base station and communications from the second base station,
   wherein communications transmitted to the second remote antenna system via the second microwave communications link include the communications from the second base station but do not include the communications from the first base station, and
   wherein the first remote antenna system is located in a cell with a first peak traffic time, and the second remote antenna system is located in a cell with a second peak traffic time different from the first peak traffic time.

5. The system of claim 4, wherein the first microwave communications link includes a millimeter-band communications link.

6. The system of claim 4, wherein the first microwave communications link includes an E-band communications link.

7. The system of claim 4, wherein the first microwave communications link includes at least one microwave transmission path between about 1 kilometer and about 3.2 kilometers in distance.

8. The system of claim 4, wherein the first microwave communications link includes at least one microwave transmission path between about 1 kilometer and about 2.4 kilometers in distance.

9. The communication system of claim 4,
   wherein the first microwave communications link is greater than 1 km in distance, and wherein the second microwave communications link is greater than 1 km in distance.

10. A remote antenna method, comprising:

a remote antenna system receiving E-band communications that travel across an E-band communications path, wherein the E-band communications path is between the remote antenna system and an E-band transceiver that is connected to a base station associated with the remote antenna system and to a base station not associated with the remote antenna system, wherein the received E-band communications include communications from the base station associated with the remote antenna system and communications from the base station not associated with the remote antenna system;

the remote antenna system selecting, from the received E-band communications, the communications from the base station associated with the remote antenna system;

the remote antenna system transmitting the selected communications from the base station associated with the remote antenna system as radio frequency communications to a mobile telephone;

the remote antenna system selecting, from the received E-band communications, the communications from the base station not associated with the remote antenna system; and the remote antenna system transmitting the selected communications from the base station not associated with the remote antenna system as E-band communications to another remote antenna system, wherein the E-band communications transmitted to the other remote antenna system do not include the communications from the base station associated with the remote antenna system.

11. The method of claim 10, wherein the E-band communications path is greater than 1 km in distance.

* * * * *

UNITED STATES PATENT AND TRADEMARK OFFICE
CERTIFICATE OF CORRECTION

PATENT NO.       : 7,664,534 B1                                      Page 1 of 1
APPLICATION NO.  : 10/859680
DATED            : February 16, 2010
INVENTOR(S)      : Harold W. Johnson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Thirtieth Day of November, 2010

David J. Kappos
*Director of the United States Patent and Trademark Office*